(12) United States Patent
Maeda

(10) Patent No.: US 8,529,072 B2
(45) Date of Patent: Sep. 10, 2013

(54) IMAGE PROJECTING DEVICE AND A PRISM WITH A CURVED REFLECTION SURFACE

(75) Inventor: Ikuo Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 450 days.

(21) Appl. No.: 13/054,854

(22) PCT Filed: Aug. 4, 2009

(86) PCT No.: PCT/JP2009/064098
§ 371 (c)(1),
(2), (4) Date: Jan. 19, 2011

(87) PCT Pub. No.: WO2010/024113
PCT Pub. Date: Mar. 4, 2010

(65) Prior Publication Data
US 2011/0122374 A1 May 26, 2011

(30) Foreign Application Priority Data
Aug. 29, 2008 (JP) ................................. 2008-222130

(51) Int. Cl.
*G03B 21/28* (2006.01)
(52) U.S. Cl.
USPC ................ 353/81; 353/33; 359/831; 359/834
(58) Field of Classification Search
USPC ............... 353/81, 33, 38; 348/771; 359/831, 359/833, 834
See application file for complete search history.

(56) References Cited

U.S. PATENT DOCUMENTS

| 7,081,999 B2 | 7/2006 | Yamazaki |
| 2006/0044521 A1 | 3/2006 | Vandorpe et al. |
| 2006/0078266 A1 | 4/2006 | Wu et al. |
| 2006/0103812 A1 | 5/2006 | Liao et al. |
| 2009/0190101 A1* | 7/2009 | Alasaarela et al. ............. 353/81 |
| 2010/0290127 A1* | 11/2010 | Kessler et al. ................ 359/631 |
| 2013/0027784 A1* | 1/2013 | Takahashi ..................... 359/669 |

FOREIGN PATENT DOCUMENTS

| JP | 2004 240050 | 8/2004 |
| JP | 2004 286946 | 10/2004 |
| JP | 2006 106683 | 4/2006 |
| JP | 2006-126385 | 5/2006 |

(Continued)

OTHER PUBLICATIONS

International Search Report issued Sep. 15, 2009 in PCT/JP09/064098 filed Aug. 4, 2009.

(Continued)

*Primary Examiner* — Francis M Legasse, Jr.
(74) *Attorney, Agent, or Firm* — Oblon, Spivak, McClelland, Maier & Neustadt, L.L.P.

(57) ABSTRACT

An image projecting device, including an image forming element for forming an image, a light source for generating light, and an imaging optical system for imaging an image formed by the image forming element on a screen, a first prism having a first transmission surface for transmitting light generated from the light source therethrough, a reflection curved surface being a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface and light reflected from the image forming element therethrough, and a second prism for directing light having transmitted through the reflection-transmission surface of the first prism to the imaging optical system.

15 Claims, 5 Drawing Sheets

(56) References Cited

FOREIGN PATENT DOCUMENTS

| | | |
|---|---|---|
| JP | 2006 251459 | 9/2006 |
| JP | 2007 025287 | 2/2007 |
| JP | 2007 033669 | 2/2007 |
| JP | 3977021 | 6/2007 |
| JP | 2008 026793 | 2/2008 |

OTHER PUBLICATIONS

Extended Search Report issued Mar. 26, 2013 in European Application No. 09809766.0.

* cited by examiner

601

602

IMAGE PROJECTING DEVICE AND A PRISM WITH A CURVED REFLECTION SURFACE

TECHNICAL FIELD

The present invention relates to an image projecting device and a prism.

BACKGROUND ART

Conventionally, various techniques for a projector using a prism have been disclosed.

For example, there are provided an optical device, an image modulating device, and a projector disclosed in Japanese Patent Application Publication No. 2006-251459, an optical engine and an image projector including an optical engine disclosed in Japanese Patent Application Publication No. 2006-106683, a projector and an illumination optical system disclosed in Japanese Patent Application Publication No. 2004-286946, and the like.

However, there may be problems of light utilization efficiency and miniaturization in the optical device, image modulating device, and projector disclosed in Japanese Patent Application Publication No. 2006-251459 and the optical engine and image projector including an optical engine disclosed in Japanese Patent Application Publication No. 2006-106683.

Specifically, in regard to the problem of light utilization efficiency in the optical device, image modulating device, and projector disclosed in Japanese Patent Application Publication No. 2006-251459, there may be provided a light loss at the second surface of a prism which is a surface transmitting illumination light emitted from an exit aperture of light-guiding means and reflecting modulated light containing at least display light, and a light loss caused by diffusion of light, from an optical rod composed of a parallel rod part arranged at the side of the exit aperture and having reflection surfaces extending in a certain direction and a taper rod part arranged at an entrance aperture and extending such that the cross-sectional shape of its reflection surface is enlarged in a direction orthogonal to that extending from the side of the entrance aperture to the side of the parallel rod part, to a reflection-type image modulating device that is a DMD.

Furthermore, in regard to the problem of light utilization efficiency in the optical engine and image projector including the optical engine disclosed in Japanese Patent Application Publication No. 2006-106683, a light loss at surfaces on which a first prism adjacent to a condenser lens is applied and provided to a second prism adjacent to a DMD may be considered.

Herein, display light modulated by the DMD is reflected from the second surface of the prism and display light emitted from the prism which is light reflected from the second surface of the prism is projected onto a screen in the background art disclosed in Japanese Patent Application Publication No. 2006-251459. When the direction in which the display light modulated by the DMD is reflected from the second surface of the prism is the horizontal direction, the second surface of the prism extends in the vertical direction.

Furthermore, light rays reflected from the DMD are reflected from the surfaces on which the first prism adjacent to the condenser lens is applied and provided to the second prism adjacent to the DMD and an image is provided onto a projection surface by the light rays reflected from the surfaces on which the first prism is applied and provided to the second prism, in the background art disclosed in Japanese Patent Application Publication No. 2006-106683. When the direction in which the light rays reflected from the DVD are reflected from the surfaces on which the first prism is applied and provided to the second prism is the horizontal direction, the surfaces on which the first prism is applied and provided to the second prism extend in the vertical direction.

Meanwhile, the deflection angle of a movable micro-mirror of a DMD (digital micro-mirror device) is ±12°. In order to separate light reflected from the DMD from light incident on the DMD without an overlap between a light beam of the light incident on the DMD and a light beam of the light reflected from the DMD, the half cone angle of a light beam of any of the light incident on the DMD and light reflected from the DMD is 12° or less. Therefore, in order to maximize the light quantity of the light reflected from the DMD, the half cone angle of a light beam of any of the light incident on the DMD and light reflected from the DMD is a separation limit angle of 12° which is equal to the deflection angle of a movable micro-mirror.

Then, when such a light beam of the light reflected from the DVD which has a half cone angle of 12° is reflected from the second surface of the prism in the background art disclosed in Japanese Patent Application Publication No. 2006-251459 or reflected from the surfaces on which the first prism is applied and provided on the second prism in the background art disclosed in Japanese Patent Application Publication No. 2006-106683, it may be necessary for the critical angle of the second surface of the prism or the surfaces on which the first prism is applied and provided to the second prism to be 12°.

Herein, if the directions of the deflection of a movable micro-mirror of the DMD are the horizontal directions, the light reflected from the DMD is separated from the light incident on the DMD, and it may be possible to use a lens with F2.4 for projection optical means in Japanese Patent Application Publication No. 2006-251459 or a projection lens part in Japanese Patent Application Publication No. 2006-106683 in order to project a light beam of the light reflected from the DMD which has a half cone angle of 12°.

However, a movable micro-mirror of a DMD is deflected around an axis in the direction inclined by 45° with respect to the horizontal direction or vertical direction. Therefore, most of a light beam of the light reflected from the DMD overlaps with a light beam of the light incident on the DMD in the vertical direction and it may be difficult to well separate the light beam of the light reflected from the DMD from the light beam of the light incident on the DMD. Furthermore, because the light incident on the DMD is also incident on the DMD from the direction inclined with respect to the horizontal direction and the vertical direction, it may be difficult to well reflect a light beam of the light reflected from the DMD on the second surface of the prism in Japanese Patent Application Publication No. 2006-251459 or the surfaces on which the first prism is applied and provided to the second prism in Japanese Patent Application Publication No. 2006-106683, depending on the deflection of a movable micro-mirror of the DMD. Thus, a light loss may occur on the second surface of the prism in Japanese Patent Application Publication No. 2006-251459 or the surfaces on which the first prism is applied and provided to the second prism in Japanese Patent Application Publication No. 2006-106683 and about 40% of a light beam of the light reflected from the DMD which has a half cone angle of 12° may be lost.

In order to reflect a light beam having a circular cross-section shape on the second surface of the prism or the surfaces on which the first prism is applied and provided to the second prism, it may only be possible to reflect a light beam (with about F4.8 or greater) having a half cone angle of about 6° or less.

Thus, because light reflected from the second surface of the prism is projected in the background art disclosed in Japanese Patent Application Publication No. 2006-251459 or because light rays reflected from the surfaces on which the first prism is applied and provided to the second prism are projected in the background art disclosed in Japanese Patent Application Publication No. 2006-106683, a loss of a light beam of the light reflected from the DMD may occur on the second surface of the prism or the surfaces on which the first prism is applied and provided to the second prism.

Furthermore, there may be a light loss caused by diffusion of light from an optical rod composed of a parallel rod part arranged at the side of an exit aperture and having a reflection surface extending in a certain direction and a taper rod part arranged at the side of an entrance aperture and extending such that the cross-sectional shape of a reflection surface is enlarged in the direction orthogonal to extending from the side of the entrance aperture to the side of the parallel rod part, to a reflection-type image modulating device that is a DMD in the background art disclosed in Japanese Patent Application Publication No. 2006-251459, as described above.

When all of a light beam having a half cone angle of 12° is intended to be incident on a DMD, the size of the exit surface of the taper rod part at the side of the parallel rod part is (the length of one side of the effective area of the DMD)+2×(the distance from the exit surface of the taper rod part to the DMD)×tan (12°) and may be considerably greater than the length of one side of the effective area of the DMD. On the other hand, light emitted from the exit surface of the taper rod part diffuses at a certain angle. Herein, a loss of light which may be caused by its diffusion from the exit surface of the taper rod part to the DMD depends on the diffusion angle of light diffusing from the exit surface of the taper rod part or the distance from the exit surface of the taper rod part to the DMD. Because the parallel rod part is present between the taper rod part and the DMD in the background art disclosed in Japanese Patent Application Publication No. 2006-251459, a portion of light diffused from the exit surface of the taper rod part may diffuse to the outside of the parallel rod part. As a result, a light loss due to diffusion of light from the exit surface of the taper rod part may occur. Furthermore, a difference between the illuminance at a central portion of the effective area of the DMD and the illuminance at a peripheral portion of the effective area of the DMD or the difference between the illuminances at peripheral portions of the effective area of the DMD may be generated.

Next, there may be a problem of miniaturization in the background art disclosed in Japanese Patent Application Publication No. 2006-251459. As described above, when all of a light beam having a half cone angle of 12° is intended to be incident on a DMD, the size of the exit surface of the taper rod part at the side of the parallel rod part may be considerably greater than the length of one side of the effective area of the DMD. Therefore, it may be necessary to increase the size of the optical rod having the taper rod part.

Furthermore, there may also be a problem of miniaturization in the background art disclosed in Japanese Patent Application Publication No. 2006-106683. Because the optical engine includes a concave mirror and a condenser lens in addition to a prism module in the background art disclosed in Japanese Patent Application Publication No. 2006-106683, the size of the optical engine may increase.

Next, there may be a problem of light utilization efficiency, a problem of miniaturization, and a problem of complexity in the projector and illumination optical system disclosed in Japanese Patent Application Publication No. 2004-286946.

In the background art disclosed in Japanese Patent Application Publication No. 2004-286946, an integrator optical system for making uniform the intensity distribution of illumination light from a light source and emitting it is used. Herein, light emitted from the exit surface of the integrator optical system diffuses at a certain angle. In the background art disclosed in Japanese Patent Application Publication No. 2004-286946, a loss of light caused by its diffusion from the exit surface of the integrator optical system to a reflection-type modulation panel depends on the diffusion angle of light diffusing from the exit surface of the integrator optical system or its distance to a relay lens which generally conjugates the exit surface of the integrator optical system with the reflection-type modulation panel. That is, in other words, it depends on the diffusion angle of light diffusing from the exit surface of the integrator optical system and a finite effective diameter of the relay lens. Herein, a portion of light diffusing from the exit surface of the integrator optical system may diffuse to the outside of the finite effective diameter of the relay lens. As a result, a light loss caused by diffusion of light from the exit surface of the integrator optical system may occur. Furthermore, a difference between the illuminance at a central portion of the effective area of the reflection-type modulation panel and the illuminance at a peripheral portion of the effective area of the reflection-type modulation panel or a difference between peripheral portions of the effective area of the reflection-type modulation panel may be generated.

Moreover, the background art disclosed in Japanese Patent Application Publication No. 2004-286946 discloses a configuration such that a condenser mirror reflects illumination light from the relay lens which has transmitted through the inside of a prism, so as to transmit it through the inside of the prism again and a TIR surface of the prism totally reflects the illumination light from the relay lens so as to guide it to the condenser mirror, totally reflects the illumination light from the condenser mirror so as to guide it to the reflection-type modulation panel, and transmits a visual image light from the reflection-type modulation panel so as to guide it to a projection optical system, wherein the prism also reflects the illumination light from its surface other than the TIR surface and has at least five light paths in which the illumination light travels from a surface to a surface of the prism and inside the prism and passes through those light paths sequentially. That is, because the background art disclosed in Japanese Patent Application Publication No. 2004-286946 has at least five light paths in which the illumination light travels from a surface to a surface of the prism and inside the prism, the light paths of the illumination light are totally complicated and long. In particular, because the TIR surface of the prism totally reflects the illumination light from the relay lens so as to guide it to the condenser mirror and totally reflects the illumination light from the condenser mirror so as to guide it to the reflection-type modulation panel, it may be inevitable that the size of the prism will be increased in order to totally reflect all of an effective light beam of the illumination light twice.

Furthermore, because it may be necessary to arrange the condenser mirror close to a surface of the prism or to provide a prism surface which is a curved surface and provide the curved surface with a reflective coating such that it is a condenser mirror in the background art disclosed in Japanese Patent Application Publication No. 2004-286946, the configuration of the prism may be complicated and the prism may be expensive.

DISCLOSURE OF THE INVENTION

According to one aspect of an embodiment of the present invention, there is provided an image projecting device configured to project an image onto a screen, including an image forming element configured to form an image, a light source configured to generate light to illuminate the image forming element, and an imaging optical system configured to image an image formed by the image forming element on a screen, wherein the image projecting device further includes a first prism having a first transmission surface configured to transmit light generated from the light source therethrough, a reflection curved surface being a curved surface configured to directly reflect light having transmitted through the first transmission surface, a reflection-transmission surface configured to directly reflect light reflected from the reflection curved surface to the image forming element and transmit light reflected from the image forming element therethrough, and a second transmission surface configured to transmit light reflected from the reflection-transmission surface therethrough and transmit light reflected from the image forming element therethrough, and a second prism configured to direct light having transmitted through the reflection-transmission surface of the first prism to the imaging optical system.

According to another aspect of an embodiment of the present invention, there is provided a prism for an image projecting device configured to project an image onto a screen and including an image forming element configured to form an image, a light source configured to generate light to illuminate the image forming element, and an imaging optical system configured to image an image formed by the image forming element on a screen, wherein the prism has a first transmission surface configured to transmit light generated from the light source therethrough, a reflection curved surface being a curved surface configured to directly reflect light having transmitted through the first transmission surface, a reflection-transmission surface configured to directly reflect light reflected from the reflection curved surface to the image forming element and transmit light reflected from the image forming element therethrough, and a second transmission surface configured to transmit light reflected from the reflection-transmission surface therethrough and transmit light reflected from the image forming element therethrough.

EXPLANATION OF LETTERS OR NUMERALS

Figure 1A:
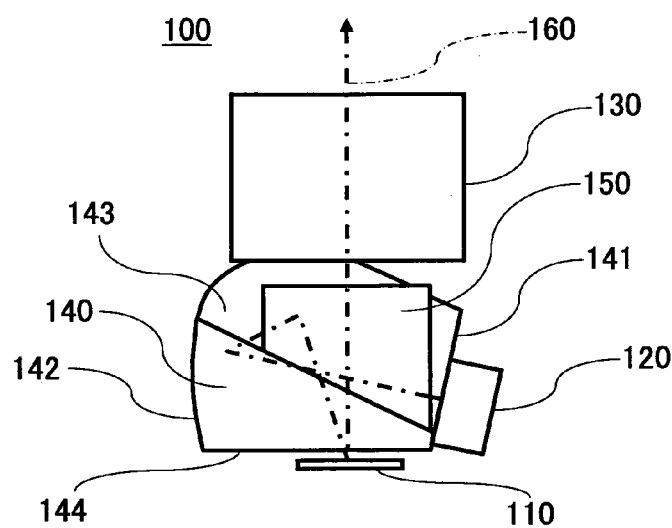
FIG. 1A, FIG. 1B, and FIG. 1C are diagrams schematically illustrating one example of an image projecting device according to an illustrative embodiment of the present invention.

100, 501, 502, 601, or 602: Projector
110, 210, 310, 510, or 610: Image forming panel
120, 520, or 620: Light source
130 or 630: Projection lens
140, 240, 340, 540, or 640: First prism
141: Entrance surface
142 or 542: Reflection curved surface
143: Light path separation surface
144: Panel-opposing surface
150, 250, 350, 550, 651, or 652: Second prism
151 or 551: Micro-gap
160 or 560: Representative light
260: Effective light beam
571, 572, or 670: Taper rod lens
681 or 682: Reflection surface

BEST MODE FOR CARRYING OUT THE INVENTION

An illustrative embodiment of the present invention may relate to at least one of an image projecting device and a prism, a prism system, and a projection optical system.

A first object of an illustrative embodiment of the present invention may be to provide a novel image projecting device.

A second object of an illustrative embodiment of the present invention may be to provide a novel prism.

A third object of an illustrative embodiment of the present invention may be to provide a novel prism system.

A fourth object of an illustrative embodiment of the present invention may be to provide a novel projection optical system.

A first aspect of an illustrative embodiment of the present invention may be an image projecting device for projecting an image onto a screen, which includes an image forming element for forming an image, a light source for generating light for illuminating the image forming element, and an imaging optical system for imaging an image formed by the image forming element on a screen, wherein the image projecting device is characterized in that it includes a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system.

A second aspect of an illustrative embodiment of the present invention may be a prism for an image projecting device for projecting an image onto a screen, which includes an image forming element for forming an image, a light source for generating light for illuminating the image forming element, and an imaging optical system for imaging an image formed by the image forming element on a screen, wherein the prism is characterized in that it has a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough.

A third aspect of an illustrative embodiment of the present invention may be a prism system for an image projecting device for projecting an image onto a screen, which includes an image forming element for forming an image, a light source for generating light for illuminating the image forming element, and an imaging optical system for imaging an image formed by the image forming element on a screen, wherein the prism system is characterized in that it includes a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system.

A fourth aspect of an illustrative embodiment of the present invention may be a projection optical system for projecting an image onto a screen, wherein the projection optical system is characterized in that it includes the prism according to the second aspect of an illustrative embodiment of the present invention or the prism system according to the third aspect of an illustrative embodiment of the present invention and an imaging optical system for imaging the image on the screen.

According to a first aspect of an illustrative embodiment of the present invention, it may be possible to provide a novel image projecting device.

According to a second aspect of an illustrative embodiment of the present invention, it may be possible to provide a novel prism.

According to a third aspect of an illustrative embodiment of the present invention, it may be possible to provide a novel prism system.

According to a fourth aspect of an illustrative embodiment of the present invention, it may be possible to provide a novel projection optical system.

Next, an illustrative embodiment(s) of the present invention will be described with reference to the drawings.

A first illustrative embodiment of the present invention is an image projecting device for projecting an image onto a screen, which includes an image forming element for forming an image, a light source for generating light for illuminating the image forming element, and an imaging optical system for imaging an image formed by the image forming element on a screen, wherein the image projecting device includes a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system.

Herein, the reflection curved surface for directly reflecting light having transmitted through the first transmission surface is intended to make light having transmitted through the first transmission surface to be incident on the reflection curved surface and to reflect it from the reflection curved surface without reflecting it from another surface of the first prism. Furthermore, the reflection-transmission surface for directly reflecting light reflected from the reflection curved surface to the image forming element is intended to reflect light reflected from the reflection curved surface, from the reflection-transmission surface to the image forming element, without reflecting it from another surface of the first prism. Moreover, the reflection curved surface of the first prism may be provided with a reflective coating such as a metal reflective coating using aluminum.

For example, the first transmission surface, the reflection curved surface, the reflection-transmission surface, and the second transmission surface may be arranged such that the first transmission surface and the reflection curved surface are opposed to each other and the reflection-transmission surface and the second transmission surface are opposed to each other.

In addition, the image projecting device may be, for example, a projector device such as a portable projector device or a compact projector device and may be used for, for example, a projection TV.

Furthermore, the image forming element may be, for example, an image forming panel such as a DMD (digital micro-mirror device). The DMD has plural movable micro-mirrors arranged in its longitudinal and lateral directions, and an image is formed by controlling the angle of each mirror surface of the movable micro-mirrors.

Moreover, for the light source, it may be possible to provide, for example, a round-type LED, a surface-emitting-type LED, a laser array, a semiconductor laser, a high-pressure mercury lamp, and the like. In order to provide a compact image projecting device, it is preferable that the light source is a compact light source (illumination source) such as a round-type LED or a surface-emission-type LED.

Furthermore, it may be, for example, a color light source (illumination source) such as a red color, green color, or blue color LED or a trichromatic color chip. Alternatively, a color light source may be obtained by using a combination of a white color light source and a color wheel.

The imaging optical system is a projection lens system including at least one of a lens(es) having a power and a mirror(s) having power. The projection lens system may be, for example, a telecentric projection lens system.

Furthermore, the screen (surface subjected to projection) may be a screen that is provided integrally with the image projecting device or may be a screen separate from the image projecting device.

In the image projecting device according to the first illustrative embodiment of the present invention, first, light generated by the light source is incident on the first transmission surface of the first prism and transmits through the first transmission surface. Then, in the first prism, light having transmitted through the first transmission surface is directly incident on the reflection curved surface and is reflected from the reflection curved surface to the reflection-transmission surface. Then, in the first prism, light reflected from the reflection curved surface is incident on the reflection-transmission surface and is reflected from the reflection-transmission surface to the second transmission surface. Then, light reflected from the reflection-transmission surface is incident on the second transmission surface and transmits through the second transmission surface to the image forming element outside the first prism. Light having transmitted through the second transmission surface is incident on the image forming element and is subjected to its modulation corresponding to image information from the image forming element, outside the first prism. Then, light modulated by the image forming element is reflected from the image forming element and is incident on the second transmission surface of the first prism again. Light having been incident on the second transmission surface transmits through the second transmission surface to the reflection-transmission surface in the first prism again. Then, light having transmitted through the second transmission surface transmits through the reflection-transmission surface. Then, light having transmitted through the reflection-transmission surface of the first prism is incident on the second prism. Then, light having been incident on the second prism travels in the second prism and is emitted from the second prism toward the imaging optical system. That is, light having transmitted the reflection-transmission surface of the first prism is directed to the imaging optical system by the second prism. Finally, light emitted from the second prism is imaged on the screen by the imaging optical system. Thus, light provided with image information formed by the image forming element is imaged on the screen and an image is projected onto the screen.

In the image projecting device according to the first illustrative embodiment of the present invention, the reflection-transmission surface reflects light incident from the reflection curved surface onto the reflection-transmission surface and transmits light incident from the image forming element through the second transmission surface onto the refection-transmission surface. The reflection-transmission surface directly and totally reflects light reflected from the reflection curved surface to the image forming element. Furthermore, the shape and orientation of the reflection curved surface are optimized whereby it may be possible that light having transmitted through the first transmission surface of the first prism is reflected from the reflection curved surface to the reflection-transmission surface and reflected from the reflection-transmission surface to the second transmission surface. That is, light having been incident on the first transmission surface of the first prism is reflected by the reflection curved surface and the reflection-transmission surface only twice. Accordingly, light incident on the first transmission surface of the first prism travels only the three light paths from the first transmission surface to the reflection curved surface, from the reflection curved surface to the reflection-transmission surface, and from the reflection-transmission surface to the second transmission surface, during its emission from the second transmission surface of the first prism to the image forming element. Thus, in the image projecting device according to the first illustrative embodiment of the present invention, the light path of light traveling in the first prism is simpler because the number of a reflection(s) of light in the first prism is less than a conventional one. As a result, it may be possible to realize miniaturization and/or simplification of the first prism.

The shape and orientation of the reflection curved surface and the arrangement of the reflection-transmission surface are optimized whereby it may be possible to include all of an effective light beam of light incident on the imaging optical system in the first prism. More particularly, the arrangement of the reflection-transmission surface is determined such that a light beam of light reflected from the reflection curved surface which corresponds to all of an effective light beam of light incident on the imaging optical system is totally reflected by the reflection-transmission surface and a light beam of light reflected from the image forming element and having transmitted through the second transmission surface which corresponds to all of an effective light beam of light incident on the imaging optical system is transmitted therethrough. Furthermore, the shape and arrangement of the reflection curved surface is determined such that a light beam of light incident on the reflection curved surface which corresponds to all of an effective light beam of light incident on the imaging optical system enters the first prism from the light source through a particular area of the first transmission surface. Moreover, the first transmission surface is preferably arranged at the position of the pupil of an effective light beam of light incident on the imaging optical system or near the position of the pupil of an effective light beam of light incident on the imaging optical system. In this case, the light source is arranged to contact the first transmission surface or the light source is arranged near the first transmission surface whereby it may be possible to illuminate the image forming element with light corresponding to an effective light beam of light incident on the imaging optical system more efficiently.

Thus, the image projecting device according to the first illustrative embodiment of the present invention includes a first prism having a first transmission surface for transmitting light generated from a light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system, whereby it may be possible to provide an image projecting device that is compact and/or has a higher light utilization efficiency.

In the image projecting device according to the first illustrative embodiment of the present invention, preferably, the first transmission surface is a flat surface. Herein, being a flat surface includes both being a completely flat surface and being substantially regarded as a flat surface. In this case, it may be possible to design and produce the first prism more readily.

In the image projecting device according to the first illustrative embodiment of the present invention, preferably, the reflection curved surface is a spherical surface. In this case, it may be possible to design and produce the first prism more readily because the reflection curved surface is a simple spherical surface.

In the image projecting device according to the first illustrative embodiment of the present invention, preferably, the reflection curved surface is an aspherical surface. In this case, it may be possible to improve the degree of light condensation of light corresponding to an effective light beam incident on the imaging optical system at the first transmission surface and it may be possible to increase the light utilization efficiency of the image projecting device.

In the image projecting device according to the first illustrative embodiment of the present invention, preferably, the aspherical surface is an anamorphic and aspherical surface. The anamorphic and aspherical surface may be, for example, a toroidal surface. In this case, it may be possible to improve the degree of light condensation of light corresponding to an effective light beam incident on the imaging optical system at the first transmission surface in two directions orthogonal to each other which correspond to two orthogonal axes of the anamorphic and aspherical surface and it may be possible to increase a light utilization efficiency of the image projecting device.

In the image projecting device according to the first illustrative embodiment of the present invention, preferably, the aspherical surface is a free-form curved surface. In this case, it may be possible to improve the degree of light condensation of light corresponding to an effective light beam incident on the imaging optical system at the first transmission surface with respect to various points on an effective area of the image forming element and/or the diameter of a light beam of light corresponding to an effective light beam incident on the imaging optical system, and it may be possible to further increase a light utilization efficiency of the image projecting device.

In the image projecting device according to the first illustrative embodiment of the present invention, preferably, the reflection-transmission surface is a flat surface. Herein, being a flat surface includes both being a completely flat surface and being substantially regarded as a flat surface. In this case, it may be possible to design and produce the first prism more readily.

In the image projecting device according to the first illustrative embodiment of the present invention, preferably, the second transmission surface. is a flat surface. Herein, being a flat surface includes both being a completely flat surface and being substantially regarded as a flat surface. In this case, it may be possible to design and produce the first prism more readily.

In the image projecting device according to the first illustrative embodiment of the present invention, preferably, the reflection-transmission surface and the second transmission surface are flat surfaces inclining with respect to each other. Herein, being a flat surface includes both being a completely flat surface and being substantially regarded as a flat surface. For example, when the image forming element is a DMD, each movable micro-mirror of the DMD swings around a diagonal line of the movable micro-mirror inclining by 45° with respect to the horizontal direction and vertical direction, and therefore, light incident on the DMD travels to a direction oblique with respect to the panel of the DMD. When the reflection-transmission surface and the second transmission surface are flat surfaces inclining with respect to each other, it may be possible for light incident on a DMD to travel to a direction oblique with respect to the panel of the DMD more readily.

In the image projecting device according to the first illustrative embodiment of the present invention, preferably, the second prism has a transmission surface that is a flat surface for transmitting light having transmitted through the reflection-transmission surface of the first prism therethrough and the second prism is arranged such that the transmission surface of the second prism is parallel to the reflection-transmission surface of the first prism. Herein, being a flat surface includes both being a completely flat surface and being substantially regarded as a flat surface. Also, being parallel includes both being completely parallel and being substantially parallel. In this case, the direction of travel of light transmitting through the transmission surface of the second prism completely or substantially coincides with the direction of travel of light having transmitted through the second transmission surface of the first prism, and therefore, it may be possible to direct light having transmitted through the reflection-transmission surface of the first prism to the imaging optical system more readily.

In the image projecting device according to the first illustrative embodiment of the present invention, preferably, the second prism has a reflection surface for reflecting light having transmitted through the reflection-transmission surface of the first prism. Additionally, the reflection surface of the second prism may be provided with a reflective coating such as a metal reflective coating using aluminum. In this case, the direction of travel of light traveling in the second prism is changed depending on arrangement of the reflection surface of the second prism, and therefore, it may be possible to optimize the overall shape and/or size of the image projecting device.

In the image projecting device according to the first illustrative embodiment of the present invention, preferably, the first prism further has a third flat surface and fourth flat surface which are parallel to each other. Herein, being parallel includes both being completely parallel and being substantially parallel. Also, being a flat surface includes both being a completely flat surface and being substantially regarded as a flat surface. In this case, it may be possible to design and produce the first prism more readily. Furthermore, it may be possible to arrange the first prism in the image projecting device more readily by using the third flat surface and fourth flat surface which are parallel to each other.

In the image projecting device according to the first illustrative embodiment of the present invention, preferably, surfaces of the first prism are composed of the first transmission surface, the reflection curved surface, the reflection-transmission surface, the second transmission surface, the third flat surface, and the fourth flat surface. For example, the first transmission surface, the reflection curved surface, the reflection-transmission surface, the second transmission surface, the third flat surface, and the fourth flat surface may be arranged such that each of the first transmission surface, reflection curved surface, reflection-transmission surface and second transmission surface are connected to the third flat surface and fourth flat surface which are parallel to each other while the first transmission surface and reflection curved surface are opposed to each other and the reflection-transmission surface and second transmission surface are opposed to each other. In this case, the first prism has only six surfaces, and therefore, it may be possible to design and produce the first prism more readily.

In the image projecting device according to the first illustrative embodiment of the present invention, preferably, the image projecting device further includes an integrator optical system for mixing light generated from the light source and making it be incident on the first prism which is connected to the first transmission surface of the first prism. Herein, the integrator optical system connected to the first transmission surface of the first prism includes an integrator optical system integrated with the first prism at the first transmission surface of the first prism, an integrator optical system bonded to the first transmission surface of the first prism, and an integrator optical system contacting the first transmission surface of the first prism. For example, the integrator optical system includes a taper rod lens. Furthermore, the surface area of the end part of the taper rod lens at the side of the light source is preferably greater than the surface area of the end part of the taper rod lens at the side of the first prism. Moreover, the shape of the end part of the taper rod lens at the side of the light source is appropriately determined depending on the shape and/or size of the light source. Furthermore, the length of the taper rod lens and the shape of the end part of the taper rod lens at the side of the first prism are appropriately determined depending on the size of the image forming element, an effective light beam of light incident on the imaging optical system, and/or the like. For example, the shape of the end part of the taper rod lens at the side of the first prism may be a circular shape depending on the shapes of the image forming element and reflection curved surface and the like. The rotation angle of the taper rod lens around the optical axis of the taper rod lens is set such that it may be possible to illuminate the image forming element with light generated from the light source efficiently. In this case, even if a light source with a large radiation angle is used, it may be possible for the integrator optical system to convert light with a large radiation angle generated from the light source into light with a smaller radiation angle and make it be directly incident on the first prism through the first transmission surface of the first prism. As a result, it may be possible to make the distribution of the incidence angle of light incident on the first prism be smaller and make light diffusing from the end part of the integrator optical system be incident on the first transmission surface of the first prism more efficiently. Thus, it may be possible to increase the amount of light transmitting through the first transmission surface of the first prism, and therefore, it may be possible to provide an image projecting device having a higher light utilization efficiency. Furthermore, when color light beams are obtained from the light source, it may also be possible to combine the color light beams due to the integrator optical system.

In the image projecting device according to the first illustrative embodiment of the present invention, preferably, the light source includes a light source for generating color light of at least three colors. For example, the light source for generating color light of at least three colors is a color chip (surface-emitting-type LED) of at least three colors. Additionally, the number and size of the color chips are appropriately determined depending on the size of the image forming element, the design of an integrator element, and/or the like. In this case, it may be possible to provide a color image projecting device with a simpler configuration without using an expensive optical element such as a dichroic prism, because the light source for generating color light of at least three colors is included.

A second illustrative embodiment of the present invention is a prism for an image projecting device for projecting an image onto a screen, which includes an image forming element for forming an image, a light source for generating light for illuminating the image forming element, and an imaging optical system for imaging an image formed by the image forming element on a screen, wherein the prism has a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough.

According to the second illustrative embodiment of the present invention, it may be possible to provide a prism capable of providing an image projecting device which is a compact and/or has higher light utilization efficiency, by having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, similarly to that described above for the first illustrative embodiment of the present invention.

A third illustrative embodiment of the present invention is a prism system for an image projecting device for projecting an image onto a screen, which includes an image forming element for forming an image, a light source for generating light for illuminating the image forming element, and an imaging optical system for imaging an image formed by the image forming element on a screen, wherein the prism system includes a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system.

According to the third illustrative embodiment of the present invention, it may be possible to provide a prism system capable of providing an image projecting device which is compact and/or has higher light utilization efficiency, by including a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system, similarly to that described above for the first illustrative embodiment of the present invention.

A fourth illustrative embodiment of the present invention is a projection optical system for projecting an image onto a screen, wherein the projection optical system includes the prism according to the second illustrative embodiment of the present invention or the prism system according to the third illustrative embodiment of the present invention and an imaging optical system for imaging the image on the screen.

According to the fourth illustrative embodiment of the present invention, it may be possible to provide a projection optical system capable of providing an image projecting device which is compact and/or has higher light utilization efficiency, by including the prism according to the second illustrative embodiment of the present invention or the prism system according to the third illustrative embodiment of the present invention, similarly to that described above for the first illustrative embodiment of the present invention.

Figure 1B:
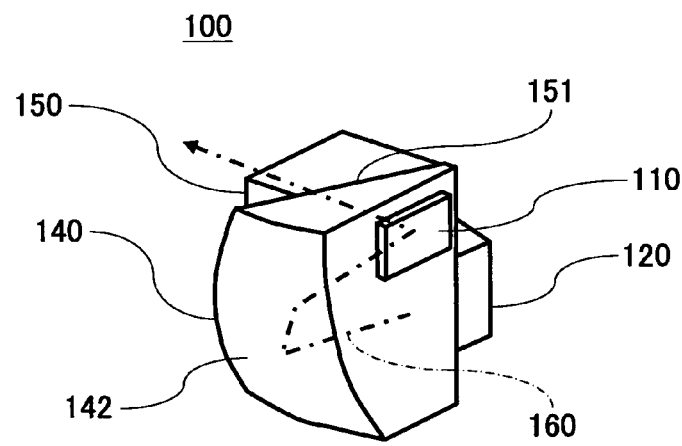
Figure 1C:
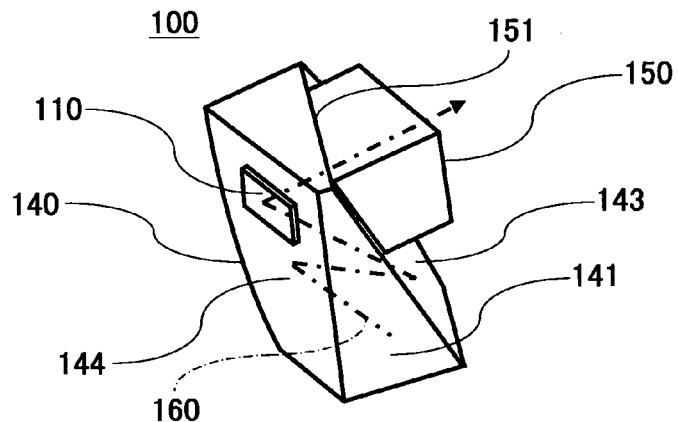

FIG. 1A, FIG. 1B, and FIG. 1C are diagrams schematically illustrating one example of an image projecting device according to an illustrative embodiment of the present invention. Herein, FIG. 1A is a top view of one example of an image projecting device according to an illustrative embodiment of the present invention, FIG. 1B is a left front perspective view of one example of an image projecting device according to an illustrative embodiment of the present invention, and FIG. 1C is a right front perspective view of one example of an image projecting device according to an illustrative embodiment of the present invention. However, a projection lens as illustrated in FIG. 1A is omitted in FIG. 1B, and both a projection lens as illustrated in FIG. 1A and a light source as illustrated in FIG. 1A and FIG. 1B are omitted in FIG. 1C.

A projector 100 as an image projecting device illustrated in FIG. 1A, FIG. 1B, and FIG. 1C includes an image forming panel 110 as an image forming element, a light source 120, a projection lens 130 as an imaging optical system, a first prism 140 as a first prism or simply a prism, and a second prism 150 as a second prism. Herein, the projector 100 projects onto a screen an image formed by the image forming panel 110 for forming an image. Furthermore, the light source 120 generates light for illuminating the image forming panel 110. Moreover, the projection lens 130 images an image formed by the image forming panel 110 on a screen. Additionally, the first prism 140 and the second prism 150 constitute an example of a prism system according to an illustrative embodiment of the present invention. Also, the first prism 140 or a prism system composed of the first prism 140 and the second prism 150, and the projection lens 130 constitute an example of a projection optical system according to an illustrative embodiment of the present invention.

The first prism 140 is composed of an entrance surface 141 as a first transmission surface, a reflection curved surface 142, a light path separation surface 143 as a reflection-transmission surface, a panel-opposing surface 144 as a second transmission surface, and two flat surfaces which are parallel to each other, as a third flat surface and a fourth flat surface. Herein, the entrance surface 141 is a flat surface for transmitting light generated from the light source 120. Furthermore, the reflection curved surface 142 is a curved surface for directly reflecting light having transmitted through the entrance surface 141. The reflection curved surface 142 is a spherical surface, and however, may be an aspherical surface such as an anamorphic and aspherical surface or a free-form aspherical surface. Furthermore, the light path separation surface 143 is a flat surface for directly and totally reflecting light reflected from the reflection curved surface 142 to the image forming panel 110 and transmitting light reflected from the image forming panel 110 therethrough. Moreover, the panel-opposing surface 144 is a flat surface for transmitting light reflected from the light path separation surface 143 and transmitting light reflected from the image forming panel 110 therethrough. Additionally, the light path separation surface 143 inclines with respect to the panel-opposing surface 144. Furthermore, the reflection curved surface 142 opposes the entrance surface 141 and the light path separation surface 143 opposes the panel-opposing surface 144.

The second prism 150 directs light having transmitted through the light path separation surface 143 of the first prism 140 to the projection lens 130. Herein, the second prism 150 has a first transmission surface that is a flat surface for transmitting light having transmitted through the light path separation surface 143 of the first prism 140. Furthermore, the second prism 150 has a second transmission surface opposing the projection lens 130 which transmits light traveling in the second prism 150 to the projection lens 130 outside the second prism 150. Moreover, the second prism 150 is arranged such that a transmission surface of the second prism 150 is parallel to the light path separation surface 143 of the first prism 140 and a micro-gap 151 is formed between a transmission surface of the second prism 150 and the light path separation surface 143 of the first prism 140.

Next, the light path of a representative light 160 generated from the light source 120 in the projector 100 will be described. Light (representative light 160) generated from the light source 120 is incident on the entrance surface 141 of the first prism 140 and transmits through the entrance surface 141 toward the reflection curved surface 142. Then, light having transmitted into the first prism 140 is reflected from the reflection curved surface 142 toward the light path separation surface 143. Then, light reflected from the reflection curved surface 142 is totally reflected from the light path separation surface 143 toward the panel-opposing surface 144. Light having been totally reflected from the light path separation surface 143 transmits through the panel-opposing surface 144 and is once emitted from the first prism 140. Herein, light emitted from the first prism 140 is incident on the image forming panel 110 and the first prism 140 is designed such that the incidence angle of light incident on the image forming panel 110 is a predetermined angle. For example, when the image forming panel 110 is a DMD, the light axis of light incident on the image forming panel 110 is in a 45° oblique direction with respect to the horizontal direction and vertical direction of the image forming panel 110 and the incidence angle of light incident on the image forming panel 110 is 24° (=a swing angle of the DMD±12°×2). Then, light modulated by the image forming panel 110 is reflected in a direction perpendicular to the image forming panel 110. Light reflected from the image forming panel 110 is incident on the panel-opposing surface 144 of the first prism 140 again. Light incident on the panel-opposing surface 144 transmits through the panel-opposing surface 144, travels in the first prism 140, and arrives at the light path separation surface 143. Light having arrived at the light path separation surface 143 transmits through the light path separation surface 143 and is emitted from the light path separation surface 143 of the first prism. Then, light emitted from the light path separation surface 143 is incident on the first transmission surface of the second prism 150 through the micro-gap 151 provided between the first prism 140 and the second prism 150. Light incident on the first transmission surface of the second prism 150 is emitted from the second transmission surface of the second prism 150 to the projection lens 130. Light emitted from the second prism 150 is imaged on a screen by the projection lens 130. Thus, an image formed by the image forming panel 110 is projected onto a screen.

Thus, the first prism 140 having the entrance surface 141, the reflection curved surface 142, the light path separation surface 143, and the panel-opposing surface 144 is used whereby it may be possible to provide the projector 100 that is compact and/or has higher light utilization efficiency.

Figure 2:
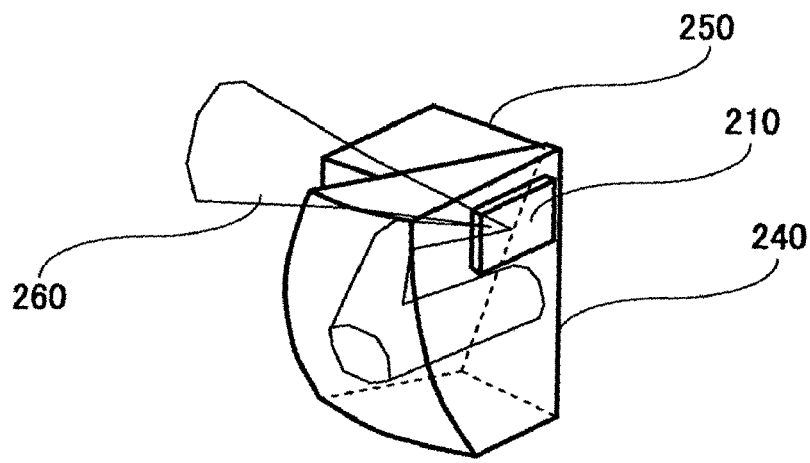
FIG. 2 is a diagram schematically illustrating an example of an effective light beam in one example of an image projecting device according to an illustrative embodiment of the present invention.

FIG. 2 is a diagram schematically illustrating an example of an effective light beam in one example of an image projecting device according to an illustrative embodiment of the present invention.

In FIG. 2, illustrated are an image forming panel 210 as an image forming element in an image projecting device according to an illustrative embodiment of the present invention, a first prism 240 as a first prism therein, and a second prism 250 as a second prism therein. In FIG. 2, an effective light beam 260 of light reflected at one point near the center of the image forming panel 210 is also illustrated. The effective light beam 260 illustrated in FIG. 2 is an effective light beam in the case where a projection lens as an imaging optical system is a telecentric lens system and the brightness (F-number) of the projection lens is F2.4 (corresponding to an effective angle of ±12°). Herein, the effective angle of a projection lens is the maximum angle capable of avoiding an overlap between a light beam incident on a DMD and a light beam reflected from the DMD. When the image forming panel is a DMD, a movable micro-mirror of the DMD swings at a swing angle of ±12°, and therefore, the effective angle of a projection lens is 12°. Furthermore, before light corresponding to the effective light beam 260 incident on the projection lens is reflected from the image forming panel 210, the light axis of light corresponding to the effective light beam 260 incident on the projection lens inclines by 24° with respect to the normal line of the surface of the image forming panel 210 in a 45° oblique direction with respect to the surface of the image forming panel 210. Moreover, the light axis inclination and angular range of light corresponding to the effective light beam 260 incident on the projection lens are generally about 16° and about ±8°, respectively, due to the refractive index of the first prism 240, in regard to light corresponding to the effective light beam 260 incident on the projection lens, from a light path separation surface as a refection-transmission surface of the first prism 240 to a panel-opposing surface as a second transmission surface. Herein, the light path separation surface of the first prism 240 is arranged such that it is possible to totally reflect light corresponding to the effective light beam 260 incident on the projection lens in the first prism 240 to the image forming panel 210 and it is possible to transmit the effective light beam 260 reflected from the image forming panel 210 and being incident on the projection lens therethrough. Furthermore, when light corresponding to the effective light beam 260 incident on the projection lens is totally reflected from the light path separation surface, the direction of the light axis of light corresponding to the effective light beam 260 incident on the projection lens is deflected. However, while light corresponding to the effective light beam 260 incident on the projection lens is reflected from the reflection curved surface of the first prism 240 before it is totally reflected from the light path separation surface, the angular range of a light beam corresponding to the effective light beam 260 incident on the projection lens is retained from the reflection curved surface to the light path separation surface. The reflection curved surface is designed such that light corresponding to the effective light beam 260 having entered from the entrance surface as a first transmission surface of the first prism 240 and being incident on the projection lens has an angular range of the aforementioned light beam from the reflection curved surface to the light path separation surface and its light axis is deflected to the light path separation surface and is not directed to any of the light path separation surface and panel-opposing surface. Although FIG. 2 illustrates the effective light beam 260 of light reflected at one point near the center of the image forming panel 210, a design is conducted with respect to each point in an effective area of the image forming panel 210 whereby it may be possible to obtain all of an effective light beam of light incident on the projection lens.

Figure 3:
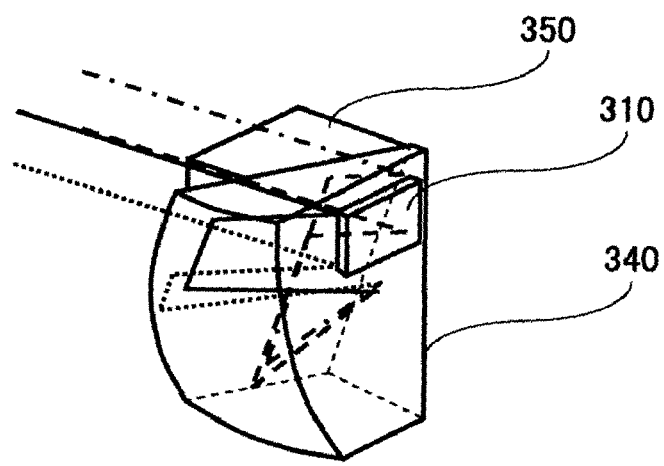
FIG. 3 is a diagram schematically illustrating examples of the light axes of effective light beams in one example of an image projecting device according to an illustrative embodiment of the present invention.

FIG. 3 is a diagram schematically illustrating examples of the light axes of effective light beams in one example of an image projecting device according to an illustrative embodiment of the present invention.

In FIG. 3, illustrated are an image forming panel 310 as an image forming element in an image projecting device according to an illustrative embodiment of the present invention, a first prism 340 as a first prism therein, and a second prism 350 as a second prism therein. FIG. 3 also illustrates the light axes of effective light beams for four endpoints of an effective area of the image forming panel 310. The location of an entrance surface as a first transmission surface of the first prism 340 is designed such that the light axes of effective light beams for four endpoints of an effective area of the image forming panel 310 collect at nearly one point near the entrance surface of the first prism 340. In other words, the entrance surface as a first transmission surface of the first prism 340 is generally located at the position of a pupil of the projection lens as an imaging optical system. Herein, when a light source is arranged near the entrance surface of the first prism 340 which is located near the position of a pupil of the projection lens, it may be possible to illuminate the image forming panel 310 with light generated from the light source efficiently.

Figure 4A:
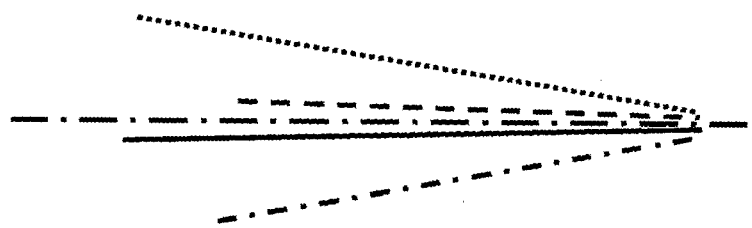
FIG. 4A and FIG. 4B are other diagrams schematically illustrating examples of the light axes of effective light beams in one example of an image projecting device according to an illustrative embodiment of the present invention.
Figure 4B:
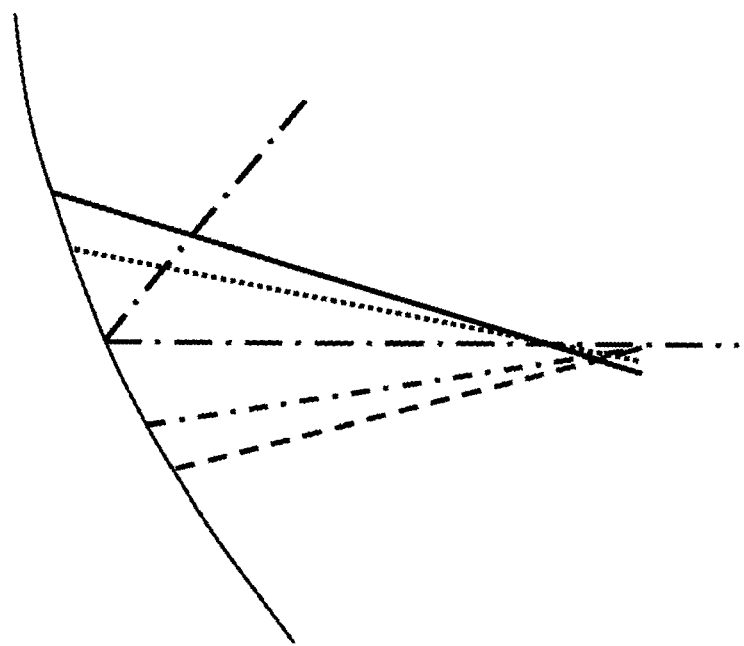

FIG. 4A and FIG. 4B are other diagrams schematically illustrating examples of the light axes of effective light beams in one example of an image projecting device according to an illustrative embodiment of the present invention. FIG. 4A is a diagram illustrating examples of the light axes of effective light beams at a cross-section including the light axis of an effective light beam at the center of an effective area of an image forming element and FIG. 4B is a diagram illustrating examples of the light axes of effective light beams at a plane perpendicular to a cross-section including the light axis of an effective light beam at the center of an effective area of an image forming element. Additionally, FIG. 4A and FIG. 4B are also enlarged views of the example of an image projecting device according to an illustrative embodiment of the present invention as illustrated in FIG. 3.

When a reflection curved surface of a first prism is a spherical surface as illustrated in FIG. 4B, the light axes of effective light beams at a cross-section including the light axis of an effective light beam at the center of an effective area of an image forming element and at a plane perpendicular thereto, as illustrated in FIG. 4A and FIG. 4B generally collect well at a first transmission surface of the first prism. That is, a light source is provided at nearly one point in a first transmission surface of a first prism whereby it may be possible to well illuminate an effective area of an image forming element. Thus, even if a reflection curved surface of a first prism is a spherical surface, it may be possible to provide an image projecting device having higher light utilization efficiency. However, there is an offset (corresponding to astigmatism) between the point of collection of the light axes of effective light beams at a cross-section including the light axis of an effective light beam at the center of an effective area of an image forming element and the point of collection of the light axes of effective light beams at a plane perpendicular to a cross-section including the light axis of an effective light beam at the center of an effective area of an image forming element, as illustrated in FIG. 4A and FIG. 4B. Therefore, when an anamorphic and aspherical surface such as a toroidal surface which has different curvatures between a cross-section including the optical axis of an effective light beam at the center of an effective area of an image forming element and a plane perpendicular thereto is used for a reflection curved surface of a first prism, it may be possible to improve the degree of collection of the light axes of effective light beams at the center of an effective area of the image forming element in a first transmission surface of the first prism, and as a result, it may be possible to improve light utilization efficiency in an image projecting device. Furthermore, when a free-form curved surface is used for a reflection curved surface of a first prism, the degree of collection of the light axes of effective light beams at the center of an effective area of an image forming element in a first transmission surface of the first prism and the degree of the angular range of an effective light beam are adjusted whereby it may be possible to further improve the light utilization efficiency of an image projecting device.

Figure 5A:
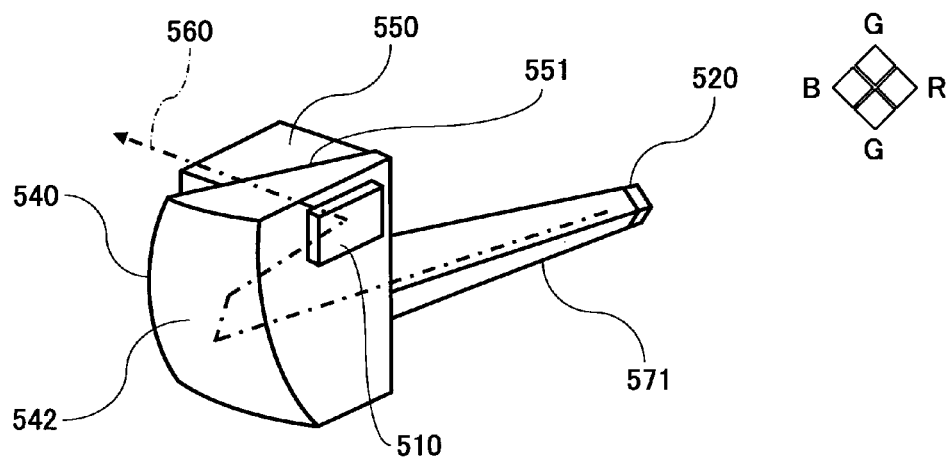
FIG. 5A and FIG. 5B are diagrams schematically illustrating other examples of an image projecting device according to an illustrative embodiment of the present invention.
Figure 5B:
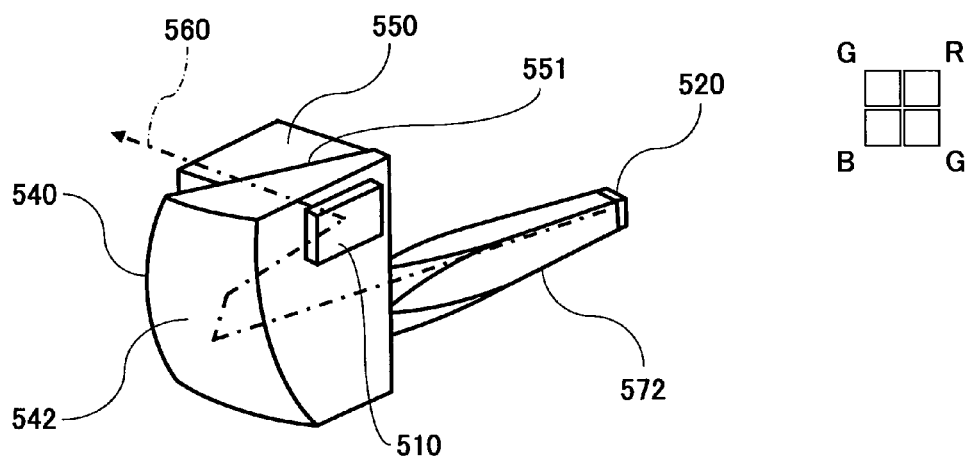

FIG. 5A and FIG. 5B are diagrams schematically illustrating other examples of an image projecting device according to an illustrative embodiment of the present invention. FIG. 5A is a diagram schematically illustrating an example of an image projecting device including a taper rod lens and FIG. 5B is a diagram schematically illustrating an example of an image projecting device including another taper rod lens.

Each of Projectors 501 and 502 as image projecting devices illustrated in FIG. 5A and FIG. 5B includes an image forming panel 510 as an image forming element, a light source 520, a first prism 540 as a first prism or simply a prism, and a second prism 550 as a second prism. Herein, the first prism 540 is composed of an entrance surface as a first transmission surface, a reflection curved surface 542, a light path separation surface as a reflection-transmission surface, a panel-opposing surface as a second transmission surface, and two flat surfaces which are parallel to each other, as a third flat surface and a fourth flat surface. Additionally, the light path separation surface inclines with respect to the panel-opposing surface. Furthermore, the reflection curved surface 542 opposes the entrance surface and the light path separation surface opposes the panel-opposing surface. Moreover, the second prism 550 is arranged such that a transmission surface of the second prism 550 is parallel to the light path separation surface of the first prism 540 and a micro-gap 551 is formed between the transmission surface of the second prism 550 and the light path separation surface of the first prism 540.

The projectors 501 and 502 illustrated in FIG. 5A and FIG. 5B further include taper rod lenses 571 and 572, respectively, as integrator optical systems for mixing light generated from the light sources 520 and making it be incident on the first prisms 540, which are connected to the entrance surfaces of the first prisms 540. That is, each of the taper rod lenses 571 and 572 is provided between the light source 520 and the entrance surface of the first prism 540 and connected to the light source 520 and the entrance surface of the first prism 540. The shapes of the entrance end and exit end of the taper rod lens 571 illustrated in FIG. 5A are rectangular or square shapes and the rotation angle of the taper rod lens 571 around the optical axis of the taper rod lens 571 illustrated in FIG. 5A is 45°. On the other hand, the shape of entrance end and shape of exit end of the taper rod lens 572 illustrated in FIG. 5B are a circular shape and a rectangular or square shape, respectively, and the rotation angle of the taper rod lens 572 around the optical axis of the taper rod lens 572 illustrated in FIG. 5B is 0°. Additionally, the shape of the entrance end of a taper rod lens is determined depending on the shape and size of a light source and the like and the length and exit end shape of a taper rod lens are determined depending on the size of the image forming panel 510, the angular range of an effective light beam, and the like. Furthermore, the rotation angle of a taper rod lens around the optical axis of the taper rod lens is determined to be an angle capable of illuminating the image forming panel 510 efficiently.

In the projectors 501 and 502 illustrated in FIG. 5A and FIG. 5B, diffused light generated from the light source 520 is incident on and transmits through the taper rod lens 571 or 572, as indicated by the light path of representative light 560 generated from the light source 520 illustrated in FIG. 5A and FIG. 5B. The angular range of diffused light generated from the light source 520 is reduced when it transmits through the taper rod lens 571 or 572. Then, diffused light with a reduced angular range is incident on the first prism 540 from the taper rod lens 571 or 572 and passes through the first prism 540 and the second prism 550 as indicated by the light path of the representative light 560 illustrated in FIG. 5A and FIG. 5B, similarly to that described with respect to the projector 100 illustrated in FIG. 1. Thus, even if the angular range of diffused light generated from the light source 520 is large, the incidence angle of light incident on the first prism 540 from the taper rod lens 571 or 572 is reduced, and therefore, it may be possible to increase the amount of light for illuminating the image forming panel 510 through the first prism 540. As a result, it may be possible to further improve the light utilization efficiency of an image projecting device. Additionally, each of the taper rod lenses 571 and 572 also has a function of color combination.

Additionally, in each of the projectors 501 and 502 illustrated in FIG. 5A and FIG. 5B, the light source 520 includes an RGB color chip as a light source for generating color light of at least three colors. The RGB color chip has one red-color (R) surface-emitting-type LED, two green-color (G) surface-emitting-type LEDs, and one blue-color (B) surface-emitting-type LED. When an LED(s) is/are used as a light source for generating color light of at least three colors, the number and size of the LED(s) are determined depending on the size of the image forming panel 510 and/or the design of the taper rod lens 571 or 572.

Figure 6A:
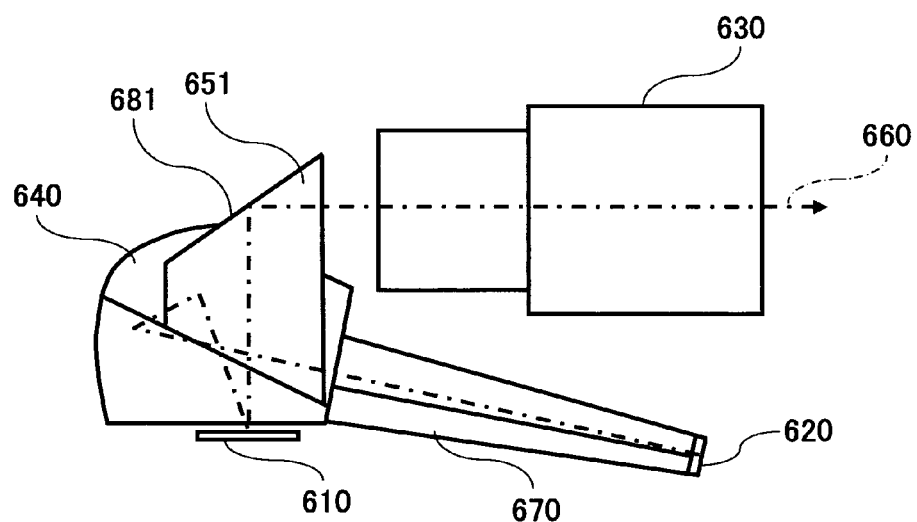
FIG. 6A and FIG. 6B are diagrams schematically illustrating yet another example of an image projecting device according to an illustrative embodiment of the present invention.
Figure 6B:
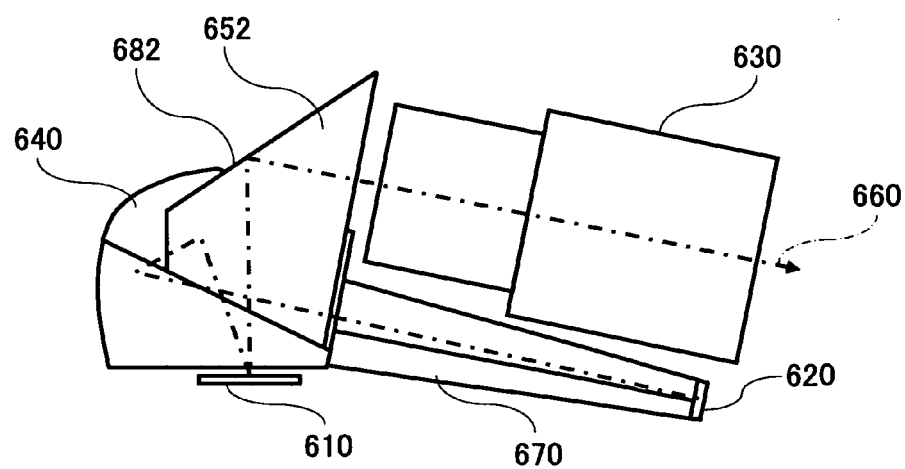

FIG. 6A and FIG. 6B are diagrams schematically illustrating yet another example of an image projecting device according to an illustrative embodiment of the present invention. FIG. 6A is a diagram schematically illustrating an example of an image projecting device including a second prism having a reflection surface. FIG. 6B is a diagram schematically illustrating an example of an image projecting device including a second prism having another reflection surface.

Each of projectors 601 and 602 as image projecting device illustrated in FIG. 6A and FIG. 6B includes an image forming panel 610 as an image forming element, a light source 620, a projection lens 630 as an imaging optical system, a first prism 640 as a first prism or simply a prism, a second prism 651 or 652 as a second prism, and a taper rod lens 670 as an integrator optical system. Herein, the first prism 640 is composed of an entrance surface as a first transmission surface, a reflection curved surface, a light path separation surface as a reflection-transmission surface, a panel-opposing surface as a second transmission surface, and two flat surfaces which are parallel to each other, as a third flat surface and a fourth flat surface. Additionally, the light path separation surface inclines with respect to the panel-opposing surface. Furthermore, the reflection curved surface opposes the entrance surface and the light path separation surface opposes the panel-opposing surface. Moreover, the second prism 651 or 652 is arranged such that a transmission surface of the second prism 651 or 652 is parallel to the light path separation surface of the first prism 640 and a micro-gap between the transmission surface of the second prism 651 or 652 and the light path separation surface of the first prism 640 is formed.

In the projectors 601 and 602 illustrated in FIG. 6A and FIG. 6B, the second prisms 651 and 652 have reflection surfaces 681 and 682 for reflecting light having transmitted through the light path separation surface of the first prisms 640, respectively. In the projector 601 illustrated in FIG. 6A, the second prism 651 is composed of a transmission surface, a reflection surface 681, and two pairs of flat surfaces which are parallel to each other. On the other hand, in the projector 602 illustrated in FIG. 6B, the second prism 652 is composed of a transmission surface, a reflection surface 682, a pair of flat surfaces which are parallel to each other, and two remaining flat surfaces. In the projectors 601 and 602 illustrated in FIG. 6A and FIG. 6B, the reflection surfaces 681 and 682 of the second prisms 651 and 652 are arranged so as to oppose the transmission surfaces of the second prisms 651 and 652, respectively.

In each of the projectors 601 and 602 illustrated in FIG. 6A and FIG. 6B, light generated by the light source 620 passes through the first prism 640 and is incident on the transmission surface of the second prism 651 or 652 as indicated by the light path of representative light 660 generated by the light source 620 illustrated in each of FIG. 6A and FIG. 6B, similarly to that described with respect to the projector 100 illustrated in FIG. 1. Light having transmitted through the transmission surfaces of the second prisms 651 and 652 is reflected from the reflection surfaces 681 and 682 of the second prisms 651 and 652, respectively, and light reflected from the reflection surfaces 681 and 682 of the second prisms 651 and 652 is emitted from surfaces connected to the transmission surfaces and reflection surfaces 681 and 682 of the second prisms 651 and 652 toward the projection lens 630.

Thus, the second prisms 651 and 652 have the reflection surfaces 681 and 682, and therefore, it may be possible to deflect light incident on the second prisms 651 and 652 appropriately. As a result, it may be possible to arrange the projection lens 630 in each of the projectors 601 and 602 appropriately. Accordingly, it may be possible to determine the sizes and forms of projectors 601 and 602 appropriately. For example, the second prism 652 as illustrated in FIG. 6B is used whereby the projector 602 illustrated in FIG. 6B has a more compact configuration than that of the projector 601 illustrated in FIG. 6A.

[Appendix]

At least one of embodiments (1) to (17) as described below may relate to at least one of an image projecting device and a prism, a prism system and a projection optical system.

Embodiment (1) is an image projecting device for projecting an image onto a screen, which includes an image forming element for forming an image, a light source for generating light for illuminating the image forming element, and an imaging optical system for imaging an image formed by the image forming element on a screen, wherein the image projecting device is characterized in that it includes a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system.

Embodiment (2) is the image projecting device as described in embodiment (1) above, wherein the image projecting device is characterized in that the first transmission surface is a flat surface.

Embodiment (3) is the image projecting device as described in embodiment (1) or (2) above, wherein the image projecting device is characterized in that the reflection curved surface is a spherical surface.

Embodiment (4) is the image projecting device as described in embodiment (1) or (2) above, wherein the image projecting device is characterized in that the reflection curved surface is an aspherical surface.

Embodiment (5) is the image projecting device as described in embodiment (4) above, wherein the image projecting device is characterized in that the aspherical surface is an anamorphic and aspherical surface.

Embodiment (6) is the image projecting device as described in embodiment (4) above, wherein the image projecting device is characterized in that the aspherical surface is a free-form curved surface.

Embodiment (7) is the image projecting device as described in any of embodiments (1) to (6) above, wherein the image projecting device is characterized in that the reflection-transmission surface is a flat surface.

Embodiment (8) is the image projecting device as described in any of embodiments (1) to (7) above, wherein the image projecting device is characterized in that the second transmission surface is a flat surface.

Embodiment (9) is the image projecting device as described in any of embodiments (1) to (6) above, wherein the image projecting device is characterized in that the reflection-transmission surface and the second transmission surface are flat surfaces inclining with respect to each other.

Embodiment (10) is the image projecting device as described in embodiment (8) or (9) above, wherein the image projecting device is characterized in that the second prism has a transmission surface that is a flat surface for transmitting light having transmitted through the reflection-transmission surface of the first prism therethrough and the second prism is arranged such that the transmission surface of the second prism is parallel to the reflection-transmission surface of the first prism.

Embodiment (11) is the image projecting device as described in any of embodiments (1) to (10) above, wherein the image projecting device is characterized in that the second prism has a reflection surface for reflecting light having transmitted through the reflection-transmission surface of the first prism.

Embodiment (12) is the image projecting device as described in any of embodiments (1) to (11) above, wherein the image projecting device is characterized in that the first prism further has a third flat surface and fourth flat surface which are parallel to each other.

Embodiment (13) is the image projecting device as described in embodiment (12) above, wherein the image projecting device is characterized in that surfaces of the first prism are composed of the first transmission surface, the reflection curved surface, the reflection-transmission surface, the second transmission surface, the third flat surface, and the fourth flat surface.

Embodiment (14) is the image projecting device as described in any of embodiments (1) to (13) above, wherein the image projecting device is characterized in that it further includes an integrator optical system for mixing light generated from the light source and making it be incident on the first prism which is connected to the first transmission surface of the first prism.

Embodiment (15) is the image projecting device as described in any of embodiments (1) to (14) above, wherein the image projecting device is characterized in that the light source includes a light source for generating color light of at least three colors.

Embodiment (16) is a prism for an image projecting device for projecting an image onto a screen, which includes an image forming element for forming an image, a light source for generating light for illuminating the image forming element, and an imaging optical system for imaging an image formed by the image forming element on a screen, wherein the prism is characterized in that it has a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough.

Embodiment (17) is a prism system for an image projecting device for projecting an image onto a screen, which includes an image forming element for forming an image, a light source for generating light for illuminating the image forming element, and an imaging optical system for imaging an image formed by the image forming element on a screen, wherein the prism system is characterized in that it includes a first prism having a first transmission surface for transmitting light generated from the light source therethrough, a reflection curved surface that is a curved surface for directly reflecting light having transmitted through the first transmission surface, a reflection-transmission surface for directly reflecting light reflected from the reflection curved surface to the image forming element and transmitting light reflected from the image forming element therethrough, and a second transmission surface for transmitting light reflected from the reflection-transmission surface therethrough and transmitting light reflected from the image forming element therethrough, and a second prism for directing light having transmitted through the reflection-transmission surface of the first prism to the imaging optical system.

Embodiment (18) is a projection optical system for projecting an image onto a screen, wherein the projection optical system is characterized in that it includes the prism as described in embodiment (16) above or the prism system as described in embodiment (17) above and an imaging optical system for imaging the image on the screen.

Although the illustrative embodiments and specific examples of the present invention have been specifically described above, the present invention is not limited to these illustrative embodiments and specific examples and these illustrative embodiments and specific examples may be altered, modified, and/or combined without departing from the spirit and scope of the present invention.

The present application claims the benefit of priority based on Japanese Patent Application No. 2008-222130 filed on Aug. 29, 2008 in Japan, the entire content of which is incorporated by reference herein.

Industrial Applicability

An illustrative embodiment of the present invention has applicability in at least one of an image projecting device, a prism, a prism system and a projection optical system.

The invention claimed is:

1. An image projecting device configured to project an image onto a screen, comprising:
an image forming element configured to form an image;
a light source configured to generate light to illuminate the image forming element; and
an imaging optical system configured to image an image formed by the image forming element on a screen,
wherein the image projecting device further comprises:
a first prism having a first transmission surface configured to transmit light generated from the light source therethrough, a reflection curved surface being a curved surface configured to directly reflect light having transmitted through the first transmission surface, a reflection-transmission surface configured to directly reflect light reflected from the reflection curved surface to the image forming element and transmit light reflected from the image forming element therethrough, and a second transmission surface configured to transmit light reflected from the reflection-transmission surface therethrough and transmit light reflected from the image forming element therethrough; and
a second prism configured to direct light having transmitted through the reflection-transmission surface of the first prism to the imaging optical system.

2. The image projecting device as claimed in claim 1, wherein the first transmission surface is a flat surface.

3. The image projecting device as claimed in claim 1, wherein the reflection curved surface is a spherical surface.

4. The image projecting device as claimed in claim 1, wherein the reflection curved surface is an aspherical surface.

5. The image projecting device as claimed in claim 4, wherein the aspherical surface is an anamorphic surface.

6. The image projecting device as claimed in claim 4, wherein the aspherical surface is a free-form curved surface.

7. The image projecting device as claimed in claim 1, wherein the reflection-transmission surface is a flat surface.

8. The image projecting device as claimed in claim 1, wherein the second transmission surface is a flat surface.

9. The image projecting device as claimed in claim 1, wherein the reflection-transmission surface and the second transmission surface are flat surfaces inclining with respect to each other.

10. The image projecting device as claimed in claim 8, wherein the second prism has a transmission surface being a flat surface configured to transmit light having transmitted through the reflection-transmission surface of the first prism therethrough and the second prism is arranged such that the transmission surface of the second prism is parallel to the reflection-transmission surface of the first prism.

11. The image projecting device as claimed in claim 9, wherein the second prism has a transmission surface being a flat surface configured to transmit light having transmitted through the reflection-transmission surface of the first prism therethrough and the second prism is arranged such that the transmission surface of the second prism is parallel to the reflection-transmission surface of the first prism.

12. The image projecting device as claimed in claim 1, wherein the second prism has a reflection surface configured to reflect light having transmitted through the reflection-transmission surface of the first prism.

13. The image projecting device as claimed in claim 1, wherein the first prism further has a third flat surface and a fourth flat surface and the third flat surface and the fourth flat surface are parallel to each other.

14. The image projecting device as claimed in claim 13, wherein surfaces of the first prism consist of the first transmission surface, the reflection curved surface, the reflection-transmission surface, the second transmission surface, the third flat surface, and the fourth flat surface.

15. A prism for an image projecting device configured to project an image onto a screen and comprising an image forming element configured to form an image, a light source configured to generate light to illuminate the image forming element, and an imaging optical system configured to image an image formed by the image forming element on a screen,
wherein the prism has:
a first transmission surface configured to transmit light generated from the light source therethrough;

a reflection curved surface being a curved surface configured to directly reflect light having transmitted through the first transmission surface;

a reflection-transmission surface configured to directly reflect light reflected from the reflection curved surface to the image forming element and transmit light reflected from the image forming element therethrough; and a second transmission surface configured to transmit light reflected from the reflection-transmission surface therethrough and transmit light reflected from the image forming element therethrough.

\* \* \* \* \*